United States Patent [19]

Akima

[11] 4,034,274

[45] July 5, 1977

[54] SPEED CONTROL DEVICE FOR DIRECT CURRENT MOTORS

[75] Inventor: Hideaki Akima, Koshigaya, Japan

[73] Assignee: Canon Kabushiki Kaisha, Tokyo, Japan

[22] Filed: Aug. 1, 1974

[21] Appl. No.: 493,837

Related U.S. Application Data

[63] Continuation-in-part of Ser. No. 416,742, Nov. 19, 1973, which is a continuation of Ser. No. 257,272, May 26, 1972, abandoned.

[30] Foreign Application Priority Data

May 28, 1971 Japan ............................. 46-36802

[52] U.S. Cl. ............................. 318/334; 318/328; 318/341
[51] Int. Cl.² ........................................ H02P 5/16
[58] Field of Search .......... 318/326, 327, 328, 341, 318/334

[56] References Cited

UNITED STATES PATENTS

| | | | |
|---|---|---|---|
| 2,776,397 | 1/1957 | McWilliams | 318/334 X |
| 3,354,371 | 11/1967 | Ainsworth | 318/341 |
| 3,396,323 | 8/1968 | Auld | 318/334 X |
| 3,437,826 | 4/1969 | Kelley | 318/341 |
| 3,609,494 | 9/1971 | Takahashi | 318/328 |
| 3,611,096 | 10/1971 | Sadashige | 318/341 |
| 3,777,234 | 12/1973 | Luger | 318/334 X |

Primary Examiner—B. Dobeck
Attorney, Agent, or Firm—Toren, McGeady and Stanger

[57] ABSTRACT

A speed control device for direct current motors comprises a tacho generator which generates signals corresponding to the rotating speed of a motor, a reference signal generating device to regulate the rotating speed of a motor uniform, a deviation detector for these signals, a comparison wave generator and a control device, the temperature characteristics of said tacho generator are offset by temperature compensating means, such as a diode arrangement whose characteristics correspond to the temperature characteristics of the tacho generator and which moves the errors introduced by the tacho generator.

20 Claims, 8 Drawing Figures

SPEED CONTROL DEVICE FOR DIRECT CURRENT MOTORS

CROSS REFERENCES TO RELATED APPLICATIONS

This application is a continuation-in-part of copending application Ser. No. 416,742 of Nov. 19, 1973 which in turn was a continuation of Ser. No. 257,272 filed May 26, 1972 and now abandoned.

BACKGROUND OF THE INVENTION

1. Field of the Invention

The present invention relates to a control device for a direct current motor, and more precisely to a speed control device which keeps the number of rotations of a small size direct current motor at a predetermined value and at the same time so controls the prescribed number of rotations of said motor as can be varied.

2. Description of the Prior Art

Heretofore, an arrangement to effect speed control of a motor which has been most widely used is a mechanical governor. However, such mechanical governor has such arrangement as essentially based on its mechanical nature, therefore it is unavoidable to have the temperature of moving parts go up or the parts wearing out, thus making it difficult to maintain accuracy in speed control.

To eliminate the above difficulty, it has been proposed to effect speed control of a motor using an electric control means.

This kind of control device is a general control system to detect the number of rotation of a motor and to compare electrically said detected value with the value of the reference number of rotation, thus controlling the driving voltage of a motor by the output from said comparison.

In this kind of conventional electric control device, the method adopted as a detection system of the number of rotations of a motor is a method to use a tacho generator and a frequency generator being connected directly with a motor, or a method to utilize the counter electromotive motive force of a motor itself, or other various methods have been proposed. On the other hand concerning an electric control circuit provided at a last step of said control process for controlling the driving voltage of a motor, a transistor circuit containing a plural number of control transistors have been generally used in conventionally adopted devices. However, many of the conventional control devices adopt such system that the above mentioned transistor circuit functions in a semi-conductive state and the voltage between a power source and a motor is made to drop by varying the internal resistance of the circuit, causing the terminal voltage of the motor to drop, and the amount of this voltage droppage is made to vary for having the same correspond with the follow the variation in a load. Therefore, the larger a dynamic range is made against the variation in the load, the more ineffective power is wasted at the transistors being connected in series at a stationary state.

Particularly when said device is applied to a speed control system of a portable type small size electrical appliance using a battery or batteries, for example such device as a tape-recorder, or a cine-camera, etc., said loss is great as will be explained below, constituting great shortcomings in regard to the size of a battery or weight of the same.

SUMMARY OF THE INVENTION

The object of the present invention is to eliminate the disadvantages of the conventional device as mentioned above, and is to provide a speed control device for direct current motors having an electric control circuit with high efficiency, wherein the loss of power by transistors is remarkably minimized thus effectively utilizing the capacity of battery, and at a same time such shortcomings as seen in a conventional speed control device for motors are eliminated.

Another object of the present invention lies in providing a speed control device for direct current motors having such arrangements that signals corresponding to the rotating speed of a motor and output signals from a comparison wave generator are compared by a comparator, and at the same time the rotating speed of a motor is controlled by the out put from said comparator.

Still another object of the present invention is to provide a speed control device for direct current motors having such arrangements that signals corresponding to the rotation speed of a motor and the signals from a reference voltage source which is adjustable are compared, then the signals of the difference therebetween and the signals from a comparison wave generator are compared by a comparator, then the speed control of a motor is effected by the output from said comparator.

Further, another object of the present invention is to provide an adjusting means for a reference voltage source for making the prescribed rotating speed of a motor variable.

The present invention allows a motion picture camera to operate at any one of a number of speeds. A cine camera should be able to have the number of frames per second of film photographed changeable to a variety of settings over a wide range. Setting the number of frames per second by changing the gears is complicated and noisy as well as expensive. Smooth resetting is difficult to carry out. For this reason, the number of frames per second is varied by changing the speed of the motor.

In a desirable pattern of an embodiment of the present invention, a frequency with such high level as being sufficient to prevent response of a motor is selected, considering the time constant of a motor, and the pulse of said frequency is given to a motor to drive the motor with such power as being average of the vlaue thereof, thus the width of pulse in varied corresponding to the variation in load, thereby the intended control is effected. By providing a speed control device with such system, the action of the output transistor becomes switching action, and the voltage dropped at the time of conductance is very small, therefore the loss of said transistor becomes very small.

The torque in a drive system of a movie camera is kept almost constant irrespective of the speed of the motor. The number of frames per second of a camera can be varied by changing the rotational speed of the motor. If a motor is loaded with a constant torque, the value of the electric current applied to the motor is nearly constant and the rotational frequency or speed of the motor is varied in proportion to the terminal voltage of the motor. Thus, if the current is to remain constant, the terminal voltage must vary with the number of frames per second. The voltage of the motor should be lowered to a value corresponding to the number of frames of film per second. Thus, where the number of frames per second are to be set over a range between 8 to 64 frames, the current of the motor cannot change over this range. If the terminal voltage of the motor at the speed of 64 frames per second is 12 volts, the terminal voltage of a motor at 8 frames per second should be lowered to 1.5 volts. This is calculated by multiplying 12 × 8/64. The residual voltage of (12 − 1.5 = 10.5) 10.5 volts can be lowered by means such as a variable resistor, a transistor, etc. At this time, the electric power consumed in the battery is the same as that for 64 frames per second. However, the electric power actually used for feeding the film is ⅛ of that. ⅞ of the electric power is wasted.

Motion picture camera with 16 millimeter film generally operate at 24 frames per second. Thus, in systems using series resistances, ⅜ of the power drawn from the battery is utilized and ⅝ of the power is wasted. If this wasted energy could be used effectively, the number of rolls of film photographed could be increased ⅝·8/3 or 1.7 times. On the other hand, the capacity of the battery can be decreased 1/1.7, which is important for a portable camera.

In a preferred embodiment of the present invention, the elements inserted in series with the motor do not waste the energy but act as switching elements for controlling the duration of pulses leaving the battery. Therefore, the electric power wasted by the resistance of the motor can be disregarded, and all the electric power can be utilized for turning the motor. Moreover, the output of the tacho generator which responds to the motor can be controlled by a voltage divider and an error signal produced with a reference signal so as to operate the motor. This maintains the desired speed of the motor. The voltage divider allows various speeds to be set reliably and efficiently.

In a motion picture camera, particularly a camera in which the film is synchronized with sound, it is extremely important to maintain the speed of the motor constant. Film speed changes due to temperature variations result in instant irregular exposure and time disagreement between the sound recording speed and the sound track at the film edge. Reproduction of such film produces irregular and unpleasant phenomena. Accordingly, it is essential that the motor drives the film at a constant speed in spite of any temperature changes under any operating conditions. In the system according to the present invention, a tachometer detects the motor speed and suitable means compares the motor speed with a predetermined speed so as to control the motor speed and eliminate any error.

The tacho generator is connected directly to the rotor of the motor and generates output voltages in proportion to the angular speed of the motor and the strength of the magnetic field of the generator field system. A tacho generator generally utilizes a permanent magnet which normally exhibits a negative temperature characteristic. Over the wide temperature range, such as −20° − +50° C to which a motion picture camera may be subject, the itensity of the magnetic field changes about 10%. Because the output voltage of the tacho generator is proportional to the intensity of the magnetic field of its field system, this temperature change has a direct influence on the output voltage of the tacho generator. Thus, the output voltage changed about 10%.

Accordingly, the tacho generator normally transmits the effect of temperaure variations to the motor speed itself. On the other hand, the invention recognizes this defects and corrects for the temperature variation introduced by the tacho generator.

According to the preferred embodiment of the present invention, the temperature characteristics of the tacho generator are offset by temperature compensating means, such as a diode arrangement whose characteristics correspond to the temperature characteristics of the tacho generator and which moves the errors introduced by the tacho generator. The present invention has resulted in speed changes less than 1% over a wide temperature range of −20° − +50° C.

The other special features of the present invention shall be revealed in the detailed explanations below referring to the drawings.

DESCRIPTION OF THE PREFERRED EMBODIMENT

Figure 1:
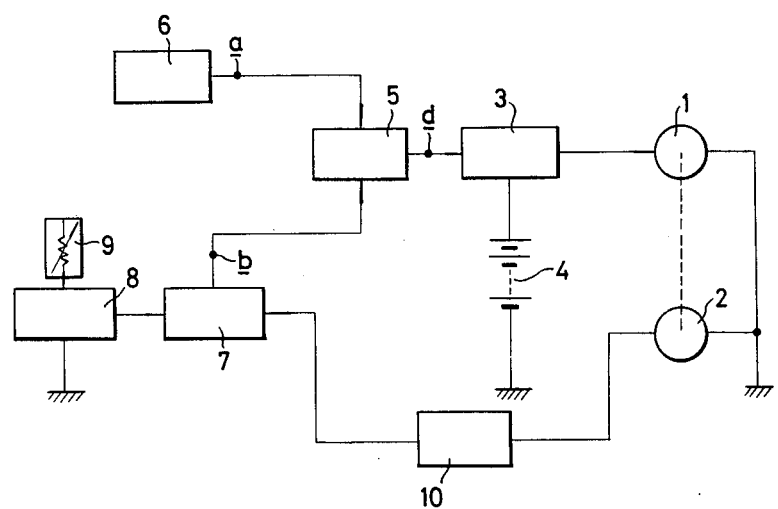
FIG. 1 is a block wiring diagram to show an outline of arrangements of a pattern of an embodiment of a speed control device for direct current motors according to the present invention.
Figure 2:
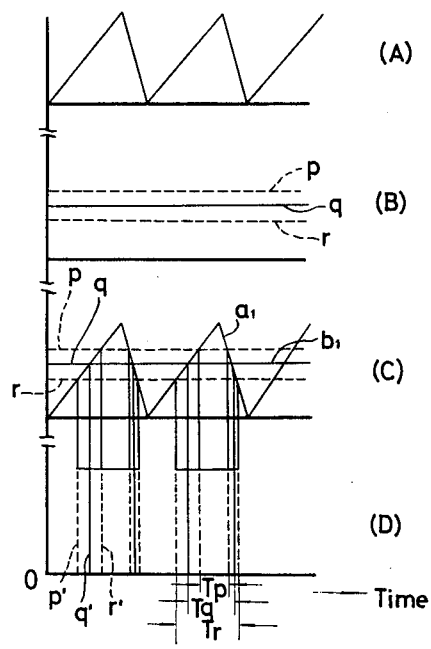
FIG. 2(A) to (D) show the wave forms of output signals in an important part of the arrangements shown in FIG. 1, indicating time in the abscissa.

The outline of the arrangements and the principle of function of a pattern of a desirable embodiment according to the present invention shall be explained to FIG. 1 and FIG. 2.

In FIG. 1, 1 is a driving motor to be controlled, 2 is a tacho generator directly connected with the driving motor 1. 3 is an output switching circuit, and 4 is a power source battery for driving motor, also serving as a battery to supply power to each circuit. At a control part, there provided signal deviation detecting means such as a comparison wave generator 6, a voltage regulator 10 to adjust the level of signal from said tacho generator, and a differential amplifier 7 into which the signal from said regulator 10 and the signal from the reference voltage source means 8 are put in, further a voltage comparator 5 into which the output from said differential amplifier and the signal from the above-mentioned comparison wave generator 6 are put in. 9 is a regulator being connected to the reference voltage source means 8 to variably adjust the reference voltage, and can be used jointly with the above-mentioned regulator 10 or either one of them may be used individually.

Next, the function of the device with said arrangement shall be explained.

The tacho generator 2 is directly connected to the motor 1, for generating a voltage proportional to the speed of the motor 1. On the other hand, the reference voltage source 8 supplies to the differential amplifier 7 such voltage as being equal to the output obtained when the tacho generator 2 is rotated with a desired number of rotation. These two voltages are compared by the differential amplifier 7, and the voltage corresponding to the difference therebetween is amplified and is sent to the comparator 5. On the other hand, in the comparison wave generator 6, comparison wave, with the above-mentioned frequency, that is, such frequency as being so sufficiently high as not to let a motor make a response, is generated. The output from the differential amplifier 7 and said comparison wave are compared by the comparator 5. This comparator is something like a differential amplifier with high amplification factor and compared said two inputs, wherein a square pulse is obtained when saw tooth waves become greater than the output of the differential amplifier 7. Now, the function of the comparator shall be explained referring to FIG. 2.

FIG. 2(A) shows an example of the output wave form at an output terminal point a (refer to FIG. 1) of the comparison wave generator 6, and said comparison wave has such wave form as having a predetermined frequency and a predetermined amplitude.

FIG. 2(B) shows the output wave form at the output terminal b(refer to FIG. 1) of the differential amplifier 7, and its level varies in such manner that when the number of rotation exceeds that in a steady state, it forms a wave form p, and with a number of rotation in a steady state it forms a wave form q, while it forms a wave form r when the number of rotation lowers below that in a steady state, corresponding to the variation of the number of rotation of a motor.

FIG. 2(C) shows a case when the both signals shown in FIG. 2(A), (B) are put in the comparator 5. FIG. 2(D) shows the output wave form at an output terminal point d(refer to FIG. 1) of the comparator 5, when said both signals are put into the comparator 5. Since the comparator 5 has its circuit established in such manner that it can have its output generated only when a comparison wave $a_1$ is greater than the output $b_1$ of the differential amplifier 7 as shown in FIG. 2(C), (D), when signals of the three different level of patterns as shown in FIG. 2 (B) are put into said comparator 5, the output of the comparator will become signals in rectangular shape of 3 different patterns, $p'$, $q'$, $r'$ as shown in FIG. 2(D). The difference among them will be the width of such rectangular wave form pulse, that is, duration time, i.e., the duration time will be $Tp$, $Tq$, $Tr$ against the above-mentioned signals $p$, $q$, $r$, respectively. That is, when the rotating speed of the motor 1 lowers itself, the wave form $p'$ is formed, and the area of the pulse increases, increasing the mean power working on the motor 1, thus the rotating speed of the motor increases up to the rotation in a steady state. On the other hand, when the rotating speed of a motor increases, the wave form $r'$ is formed, and the area of the pulse decreases, thus the mean power working on the motor 1 is reduced to cause the motor to drop its own rotating speed down to the rotation in a steady state. Since a feed back loop is formed "1 2 10 7 5 3 1", a stable and highly efficient speed control circuit is obtained.

Figure 3:
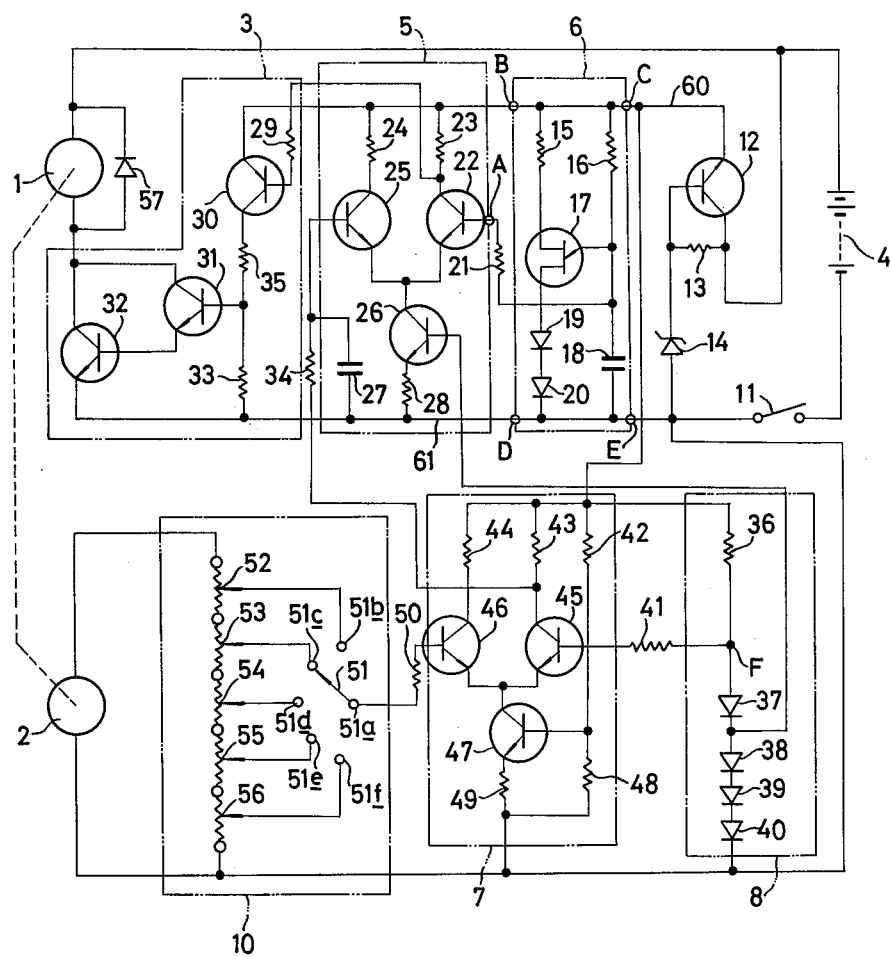
FIG. 3 shows an electric circuit connection diagram of a pattern of an embodiment of the speed control device for direct current motors according to the present invention.

When the speed is varied from a certain number of rotation in a steady state to a next number of rotation in a steady state, or when the number of rotation in a steady state is varied non-stepwise, such variation can be secured by adjusting a commonly known voltage regulating means 9 or 10 stepwise or non-stepwise, thus the present invention can have further wide application. FIG. 3 is an electric circuit connection diagram which is a concrete embodiment of the block diagram shown in FIG. 1, and each of the component elements 1 to 10 shown in FIG. 1 shall be further explained in detail referring to FIG. 3. Each part distinguished by two dot broken line show each of said element.

1 is a direct current motor which is to have its speed controlled. 2 is a speed generator, and its rotating axle is directly connected with the rotating axle of the motor 1. 4 is the above-mentioned power source battery. 11 is a power source switch. 12 is a NPN transistor, 13 is a resistance being connected in parallel with said transistor 12. 14 is a constant voltage diode. A constant voltage circuit is composed of such elements, 12, 13, 14.

60 is a lead wire being connected to an emitter of said transistor 12. 61 is a lead wire connectd to the cathode of the above-mentioned battery.

While the function of the comparison wave generator 6 was explained referring to FIG. 1, now the circuit arrangement of said generator shall be described to FIG. 3. In the comparison wave generator shown in FIG. 3, saw-tooth shape waves are used as comparison waves, and FIG. 3 shows a circuit to generate such wave form. B, C show terminals by which said wave form generating circuit is connected with the lead wire 60. D. E show terminals for connection with the lead wire 61. A is an output terminal of said wave form generating circuit. 15, 16 are resistance, 17 are a unijunction transistor, 18 is a capacitor, and 19, 20 are diodes. A saw tooth shape wave generation circuit is composed of such elements 15, 16, 17, 18, 19, 20 as mentioned above.

The part 5 distinguished by the two-dot broken line is a circuit arrangement for the above-mentioned comparator. 22, 25, 26 are NPN transistors, 21, 23, 24, 28 are resistances, and 27 is a capacitor. The output terminal A of the above-mentioned comparison wave circuit is connected with the base of the transistor 22. Both emitters of the transistors 22, 25 are connected together and at a same time these emitters are connected to the collector of the transistor 26, forming a differential type amplification circuit.

The part 7 distinguished by the two dot broken line is a circuit arrangement for the above-mentioned differential amplifier. 42, 43, 44, 48, 49 are resistances, and 45, 46, 47 are NPN transistors. The base of the transistor 45 is connected with the generation circuit of a reference voltage source 8 which is to be described later and its collector is connected with the base of the transistor 25 of the above-mentioned comparator 5 through the resistance 34. The emitters of the transistors 45, 46 are connected to each other, and at a same time they are connected with the collector of the transistor 47. The transistor 47 and the resistance 49 form so-called constant current circuit. This differential amplifier 7 can be composed as an IC-unit, which can provide space-wise advantage.

The 8 distinguished by the two-dot broken line shows a generation circuit for the above-mentioned reference voltage source 8. 36 is a resistance and 37 to 40 are diodes for temperature compensation of the reference voltage source 8. F is an output terminal with a reference voltage.

Naturally a conventional voltage regulator for varying the value of the reference voltage can be attached to said reference voltage generating circuit as shown in FIG. 1.

The part 3 distinguished by two-dot broken line shows the above-mentioned output switching circuit. 29, 33, 35 are resistances, 30 is a PNP transistor, and 31, 32 are NPN transistors. The emitter of the transistor 30 is connected with a lead wire 60, while its base is connected to the collector of the transistor 22.

The transistors 31 and 32 are connected with so-called Darlington connection to effect amplification of current.

The part 10 distinguished by the two-dot broken line shows a circuit arrangement to adjust voltage generated in proportionate with the rotation speed of the motor by a speed generator, and a switch piece or movable contact member 51 which can be changed and contacts 51a to 51f are attached to this part 10. Each of said contacts is connected respectively with each of resistances 52 and 56 which are slidable. The movable contact member 51 selectively contacts any one of a number of fixed contacts 51b – 51f. An operating knob or other switchover device moves the contact member 51 to change the number of frames per second. Contacts 51b to 51f corresponds to a range of 8 frames per second to 16 frames per second.

Next, the function of the speed control device with such arrangement shall be explained.

The constant voltage generation circuit composed of the elements 12, 13, 14 as mentioned above has such function as supplying current from the power source to the circuit of each part through said constant voltage circuit so that the variation in the power source battery 4 will not affect the circuit of each part. When the power source switch 11 is closed and current is flown to the constant voltage diode 14 through the resistance 13, the terminal voltage of said diode 14 will take a constant value regardless of the current flowing in because of its very nature. Thus by supplying a predetermined voltage to the base of the transistor 12, the output voltage at the emitter side of said transistor will take a predetermined value according to the principle of function of the transistor. This predetermined voltage is used as power source of each of the circuits mentioned above through the lead wire 60.

Next, the function of the saw-tooth shape wave generation circuit 6 will be as follows.

When charging circuit flows from the above-mentioned constant voltage source to the capacitor 18 through the resistance 16, the terminal voltage of said capacitor 18 gradually increases, and as the voltage of the emitter and the first base of the uni-junction transistor 17 reaches a peak voltage, the emitter current suddenly increases, discharging the charge at a capacitor and lowering its terminal voltage. By repeating this process saw-tooth shape wave is generated. The diodes 19, 20 are to generate a constant voltage.

Next, function of a reference voltage generating circuit 8 shall be explained. This circuit is to generate such reference voltage as corresponding to electromotive voltage generated when the above-mentioned speed generator gains a prescribed number $n_o$ of rotation. In this circuit a prescribed level of voltage is generated utilizing the voltage droppage in plus direction of the four diodes 37 to 40. Said voltage dropped in plus direction of these diodes has temperature reliability. That is, when temperature is high, the terminal voltage of the diode become low while the voltage goes up as temperature lowers. Such characteristic is of similar nature as the temperature characteristic of the tacho generator 2. The tacho generator is connected directly to the rotor of the motor and generates the output voltage in proportion to the angular speed of the motor 1 and the strength of the magnetic field of the generator field system. The tacho generator generally utilizes a permanent magnet which normally exhibits a negative temperature characteristic. Over the wide temperature range, such as −20° – +50° C to which a motion picture camera may be subject, the intensity of the magnetic field changes about 10%. Because the output voltage of the tacho generator is proportional to the intensity of the magnet field of its system, this temperature change has a direct influence on the output voltage of the tacho generator resulting in the output voltage changes about 10% of the tacho generator. In order to cancel this temperature characteristic of the tacho generator, the diodes train 37 – 40 forming a temperature compensating arrangement and connected with the reference voltage applying terminal F.

Next function of the differential amplifier 7 shall be explained. This amplifier compares the above-mentioned two inputs, that is, the voltage of the speed generator 2 as its electromotive voltage has its level regulated by the adjusting circuit 10, and the reference voltage from the reference voltage generating circuit 8. When the number of rotation of the motor 1 varies from the prescribed number $n_o$, such voltage as proportionate to the deviation number $\Delta n$ of rotation as varied comes out as the difference as compared with the above-mentioned reference voltage, therefore said voltage is amplified by the differential amplifier.

The transistor 47, having its collector connected with the common emitter of the transistors 45, 46, constitutes a constant current circuit, making the common emitter resistance of the transistors 45, 46 which constitutes the differential amplifier appear apparently large, thus the magnitude of amplification of the differential amplifier is enhanced. The output of said differential amplifier is in proportionate with the deviation of the number of rotation of the motor 1 from the prescribed number of rotation, and is the difference (deviation) signal being amplified by the differential amplifier.

Next, the function of the comparator 5 shall be explained.

This circuit is a differential type amplifier to compare the saw-tooth shape wave generated at the above-mentioned saw-tooth shape wave generating circuit 6 and the deviation signal from the above-mentioned differential amplifier. As has been described in reference with FIG. 2, it has its actuating point so determined that it is activated as an amplifier at such point that the comparison signal (saw-tooth signal wave) becomes larger than the deviation signal, further, as the degree of its amplification is sufficiently large, its output signal is saturated before long, and such pulse wave form as shown in FIG. 2(D) is generated.

The output wave from the above-mentioned saw-tooth wave form generating circuit 6 enters through the output terminal point A into the base of the transistor 22, while the output signal from the above-mentioned differential amplifier 7 enters into the base of the transistor 25 through the resistance 34, wherein the transistors 22, 25 constitute a differential amplifier. Both signals follow the functional characteristics of the transistors 22, 25 constituting the differential amplifier, generating the signal for the difference of said signals at the collector of the transistor 22 as previously explained, then said signal (the pulse shape rectangular wave signal shown in FIG. 2 (D)) is transmitted to next switching circuit 3.

Next function of the switching 3 shall be explained.

In this circuit the output of the comparator 5 is further amplified by the transistor 30 to form a wave form, making it a complete rectangular wave form, then sufficient current is supplied to the base of the transistor 31 being Darlington connected and coupled with the output transistor 32 to effect switching function, thereby the output transistor 32 is switched for supplying such power as modulating the width of the above rectangular wave to the motor 1, and the number of rotation of the motor is so controlled as maintaining a prescribed number of rotation as was explained previously. The diode 57 connected in parallel with said motor 1 is inserted to absorb the counter electromotive force generated at the winding of the motor 1 being driven by a control system of the rectangular wave as explained above, and to prevent breakage of the output transistor 32.

Figure 4:
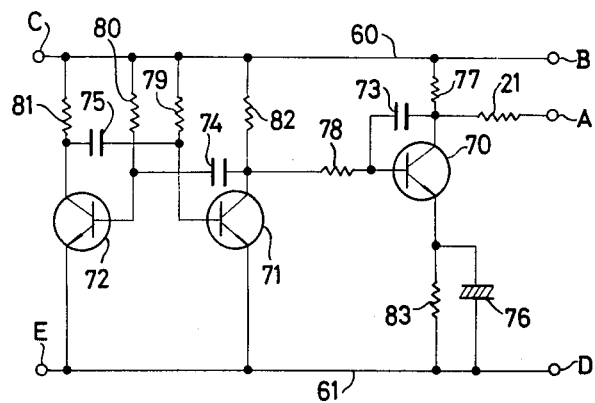
FIG. 4 shows a circuit connection diagram of circuit elements in a modified embodiment of a comparison wave generating circuit within the electric circuit connection diagram shown in FIG. 3.
Figure 5:
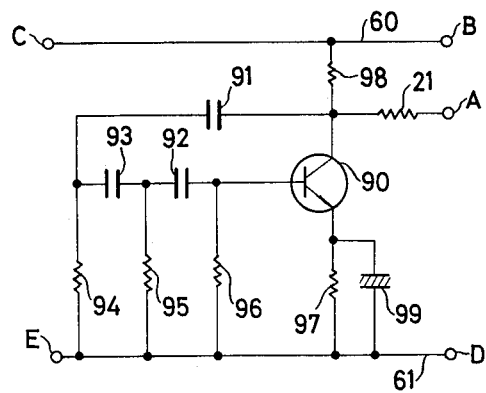
FIG. 5 shows a circuit connection diagram of the circuit elements in still another modified embodiment of the comparison wave generating circuit within the electric circuit connection diagram shown in FIG. 3.

While the circuit arrangement shown in FIG. 3 shows the saw-tooth wave generation circuit as a comparison wave generation circuit, an example of a triangular wave or a sine wave generation circuit as a comparison wave is shown respectively in FIG. 4 and FIG. 5.

FIG. 4 shows a triangular wave generation circuit 104. In the drawing, 70, 71, 72 are NPN transistors, 73, 74, 75 are capacitors, 76 is an electric field capacitor, and 77, 78, 79, 80, 81, 82, 83 are resistances. A resistance 21, lead wires 60, 61 and terminals A, B, C, D, E are same as those shown in previously shown examples.

Of the elements shown above, the transistors 71, 72 the capacitors 74, 75 and the resistances 79 through 82 compose a multi-vibrator, while the transistor 70, the capacitor 73, 76 and the resistances 77, 78, 83 compose a Miller integration circuit which effects easily a certain feedback. Since these are known circuit arrangements and can be quite easily understandable by those in the trade, detailed explanation is omitted. When a constant voltage supplied by the above-mentioned constant voltage circuit is impressed to the input terminal of the multi-vibrator, a rectangular wave signal is generated at the output terminal of the vibrator. Said output signal is further added to the above-mentioned Miller integration circuit and is integrated, then formed into a triangular wave and is generated at the output terminal A. The amplitude and wavelength of the saw-tooth wave can naturally be set as desired.

Utilizing the fact that up-riser and the down-riser of said triangular wave are of straight line shape, said wave can be supplied into the above-mentioned comparision circuit as one of its inputs in similar manner as in said saw-tooth wave, thus the speed control of the motor shown in FIG. 1 through FIG. 3 can be effected.

FIG. 5 is a sine wave generation circuit 105. In the drawing, 90 is a transistor, 91 through 93 are capacitors, 94 through 98 are resistances, 99 is an electric field capacitor. A resistance 21, lead wires 60, 61 and terminals A, B, C, D, E are same as those shown in previous examples.

The circuit shown in the drawing composes a known phase-shift oscillator wherein a phase shift circuit with a capacitor and a resistance is provided in a feed back circuit, and the function of the circuit arrangement can be quite easily understandable by those in the trade, therefore detailed explanation is omitted.

when a constant voltage supplied by the above-mentioned constant voltage circuit is impressed on the input terminal of said phase-shift oscillator, a sine wave signal is generated at the output terminal A of the oscillator. The amplitude and the wavelength of said sine wave can naturally be set, and when this sine wave is put in as one of inputs into the above-mentioned comparison circuit as a comparison wave form, speed control of a motor can be effected as in the cases shown in FIG. 1 through FIG. 4.

The comparison wave generation circuit arrangements which can be applied to the device of the present invention are not limited to those shown above, instead any wave form can be used as long as a wave form has, preferably its up-riser and down-riser have, such shape as virtually considered as straight line.

As has been explained above the present invention has such arrangement that a comparison wave having a predetermined amplitude and wavelength and the difference between an output signal corresponding to the number of rotation of a motor and a reference signal are compared to enable the device to control the speed of a motor. Therefore slight deviation from a standard rotation speed can be detected in an enlarged scale to vary the duty of a motor to a wide area of variety, thus accuracy in speed control can be enhanced.

The present invention also has such arrangement as having a means that the level of output signal corresponding to the number of rotation of a motor or the level of a reference signal to be compared with said output signal can be adjusted, therefore the invention has such effect that a prescribed number of rotation of a motor can be shifted in multi-step wise manner or in non-step wise manner, thus it is very advantageous as a speed control device for a motor.

What is claimed is:

1. A speed control system for a direct current motor, comprising a DC tacho-generator for generating a speed indicating signal normally proportional to the speed of the motor, signal level adjusting means for producing an output proportional to the signal generated by said DC tacho-generator, reference means for forming a reference signal, differential amplifier means having a first input terminal connected to the output from said adjusting means and a second input terminal connected to the signal from said reference means producing an error signal that corresponds to a difference between the output of said adjusting means and the signal from said reference means, waveform-producing means for producing a varying signal of a predetermined wave shape, comparison means responsive to said waveform-producing means and the error signal from error signal-producing means for comparing the error signal with the wave shape of said waveform-producing means for producing pulses which last as long as the relationship between the wave shape and the error signal is in one range and outside another, switching means coupled to said comparison means and responsive to the pulses therefrom for producing driving pulses having pulse widths determined by said comparison means, the speed indicating signal departing from normal proportionality to the motor speed in response to changes in temperature, said reference means having a constant voltage circuit including a constant voltage circuit including series-connected diodes which departs from a constant value at a rate corresponding to the rate at which the speed indicating signal departs from proportionality to the motor speed.

2. A system as in claim 1, wherein said temperature compensating means includes a diode arrangement whose characteristic varies the voltage thereacross according to the departure of the speed indicating signal from normal.

3. A system as in claim 2, wherein said signal generator means includes a tacho generator connected to said motor for generating the speed indicating signal.

4. A system as in claim 2, wherein said error level adjusting means includes a differential amplifier having two amplifying devices with respective input terminals, one of said input terminals being connected to said reference means.

5. A system as in claim 1, wherein said switching means includes a control voltage source for producing the pulses with substantially equal amplitudes.

6. A system as in claim 2, wherein said switching means includes a control voltage source for producing the pulses with substantially equal amplitudes.

7. A system as in claim 4, wherein said reference means includes reference voltage-adjusting means connected to said reference voltage applying circuit to permit the level of said reference signal to be subjected.

8. A system as in claim 2, wherein said waveform-producing means includes generating means for producing a waveform having a rising portion and a declining portion, said portions being substantially linear.

9. A system as in claim 8, wherein said waveform-producing means produces a signal having a frequency higher than the frequency of which the motor is capable of responding.

10. A system as in claim 8, wherein said generating means in said waveform-producing means produces a saw-tooth waveform.

11. A system as in claim 8, wherein said generating means in said waveform-producing means produces a triangular waveform.

12. A system as in claim 2, wherein said waveform-producing means produces a sine wave.

13. A system as in claim 2, wherein said comparison means includes a differential amplifier circuit for differentially comparing the error signal with the signal from said waveform-producing means, said differential amplifier including a pair of common-emitter connected transistors of the same polarity, one of said transistors having a base connected to said adjusting means, the other of said transistors having a base connected to said reference means.

14. A system as in claim 1, wherein said switching means includes a switching transistor connected in series with said motor and responsive to said comparison means.

15. A system as in claim 1, wherein said switching means includes a constant voltage source and a switch connected in series with said motor, said switch producing pulses in response to said comparison means.

16. A speed control system for a direct current motor, a tacho generator coupled to the motor for producing a speed indicating signal normally proportional to the speed of the motor but variable with temperature, reference means for producing a reference signal, differential amplifier means responsive to the tacho generator in the reference means for producing an error signal in response to the relationship between the speed indicating signal and the reference signal, generator means for producing a signal having a predetermined rising and falling wave shape, modulating means responsive to said error signal for producing a pulse signal having a plurality of pulses whose pulse durations vary with the level of said error signal, said modulating means including a comparing circuit responsive to said reference means and said differential amplifier means for comparing said error signal with the signal having the predetermined wave shape, switching means responsive to said modulating means for providing power pulses to vary the power to the motor on the basis of the widths of the pulses, and motor speed control means, said motor speed control means including signal level adjusting means between said signal generator means and said reference means for varying the proportionality of the signal applied to said amplifier means to the speed of the motor so as to vary the speed of the motor, said reference means including a constant voltage diode and a temperature compensating diode arrangement having a characteristic corresponding to the temperature induced speed indicating signal variations so as to compensate for the variations, wherein said differential amplifier means has a first input terminal connected to said signal level adjusting means and a second input terminal connected to said reference means.

17. A motion picture camera operating system, comprising direct current motor means for controlling the number of frames per second of the camera, a direct current source for driving the motor, a tacho generator coupled to the motor for generating a speed indicating signal normally proportional to the speed of said motor but varying from the normal proportionality on the basis of temperature, motor speed control means responsive to said signal generating means, said motor speed control means including signal level adjusting means coupled to said signal generator means and having voltage attenuating means and a variable selector switch for selecting the attenuation of the voltage so as to change the number of frames per second of the camera, reference voltage supplying means connected to said direct current source for stabilizing a voltage supplied by the source and producing a reference voltage representing a predetermined motor speed, error signal producing means having a first input terminal connected to said reference means and a second input terminal connected to said selector switch for comparing the signal from said adjusting means and said reference means to produce an error signal depending upon the relation between the signal from said adjusting means and said reference means, waveform signal producing means for producing a signal having a waveform with a predetermined wave shape, modulating means coupled to said waveform-producing means and said error signal producing means for modulating the error signal on the basis of the signal with predetermined wave shape so as to produce a motor-driving pulse signal having rectangular pulses whose duration time varies in accordance with the level of said error signal, and switching means responsive to said modulating means for regulating the time during which the motor is driven in response to the duration of the pulse signals so as to vary the power applied to the motor, said reference means including a diode temperature compensating arrangement in parallel with said tacho generator and having a characteristic for cancelling variations of the speed indicating signal.

18. A system for use with a motion picture camera to regulate the number of frames per second at which the camera operates, comprising a direct current motor for controlling the number of frames per second of the camera a direct current source, signal generator means coupled to the motor for generating a signal proportional to the speed of the motor, speed adjusting means responsive to the signal from said signal generator means for varying the speed of the motor so as to change the number of frames per second of the motion picture camera, said adjusting means having electrical output control means for varying the proportionality of the signal from said signal generator means to the speed of the motor and a multi-position selector switch for selecting the proportionality and producing a controlled signal, reference means for producing a reference signal, siad reference means including a temperature compensating element having series connected diodes, error signal producing means having a first input terminal connected to said speed adjusting means and a second input terminal connected to said reference means for producing an error signal by differentially comparing the controlled signal with the reference signal, and motor speed regulating means coupled to said error signal producing means for modulating said error signal to produce signals having rectangular pulses whose durations vary with the level of said error signal, said motor speed regulating means coupling the source to the motor and supplying energy to the motor during the rectangular pulses to regulate the times during which the motor is energized and maintain the speed of the motor constant at the adjusted speed thereof.

19. A speed control system for a direct current motor, comprising:
   a. a DC tacho-generator means for generating a speed signal corresponding to the speed of the motor;
   b. speed signal level adjusting means for producing an output corresponding to the speed signal, adjustment of the adjusting means varying the ratio of the output therefrom and the speed signal;
   c. reference signal supplying means for producing a fixed reference signal, said reference signal supplying means including series-connected diodes for cancelling the variations of said DC tacho-generator due to temperature change;
   d. differential amplifier means having a first input terminal connected to said adjusting means and a second input terminal connected to said reference signal supplying means, said differential amplifier means for comparing the output of said adjusting means with the reference signal of said reference signal supplying means and producing a control signal which is dependent on the output of said adjusting means and the reference signal of said reference signal supplying means; and
   e. driving means responsive to the control signal from differential amplifier means for producing a motor driving current.

20. A motion picture camera operating system, comprising:
   a. direct current motor means for controlling the number of frames per second of the camera;
   b. a DC tacho-generator for generating a speed signal corresponding to the speed of the motor;
   c. speed signal level adjusting means for producing an output signal corresponding to the speed signal, adjustment of the adjusting means varying the ratio of the output signal in response to a plurality of predetermined desired motor speeds;
   d. reference signal supplying means for producing a fixed reference signal, said reference signal supplying means including series-connected diodes for cancelling the variations in the speed signal of said DC tacho-generator due to temperature change;
   e. differential amplifier means having a first input terminal connected to said adjusting means and a second input terminal connected to said reference signal supplying means, said differential amplifier means for comparing the output of said adjusting means with the reference signal of said reference signal supplying means, and producing a control signal which is dependent on the output of said adjusting means and the reference signal of said reference signal supplying means; and
   f. driving means responsive to the control signal from the differential amplifier means for producing a motor driving current.

* * * * *